(12) United States Patent
Mayumi

(10) Patent No.: US 6,762,530 B2
(45) Date of Patent: Jul. 13, 2004

(54) MOTOR WITH STATOR HAVING INNER CORES AND OUTER CORES

(75) Inventor: Eiji Mayumi, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 09/778,270

(22) Filed: Feb. 6, 2001

(65) Prior Publication Data

US 2001/0035693 A1 Nov. 1, 2001

(30) Foreign Application Priority Data

Feb. 8, 2000 (JP) ........................................ 2000-029886

(51) Int. Cl.[7] .................................................. H02K 1/12
(52) U.S. Cl. ........................ 310/254; 310/257; 29/596
(58) Field of Search .............................. 310/49 R, 257, 310/42, 89, 254; 29/598

(56) References Cited

U.S. PATENT DOCUMENTS 6,046,519 A * 4/2000 Hanazumi et al. ........ 310/49 R
6,163,952 A * 12/2000 Takehara ..................... 29/598

FOREIGN PATENT DOCUMENTS

DE 3321254 A * 12/1984 .......... H02K/37/00
JP 08126290 A * 5/1996 ............ H02K/1/12

* cited by examiner

Primary Examiner—Burton S. Mullins
Assistant Examiner—J. Aguirrechea
(74) Attorney, Agent, or Firm—Hogan & Hartson, LLP

(57) ABSTRACT

A motor has a stator with a simplified structure having a stator section including at least two core pairs. Each of the core pairs includes inner and outer cores. Coils are wound around the core pairs. A case made of a magnetic material covers the coils in a manner that the case more securely comes in contact with the inner cores and the outer cores. The case is welded to at least the inner cores to securely form independent magnetic circuits.

5 Claims, 4 Drawing Sheets

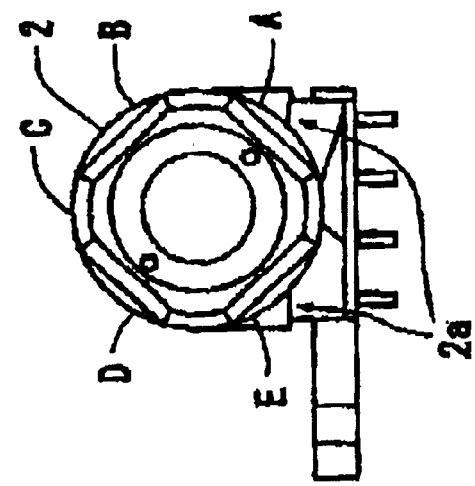
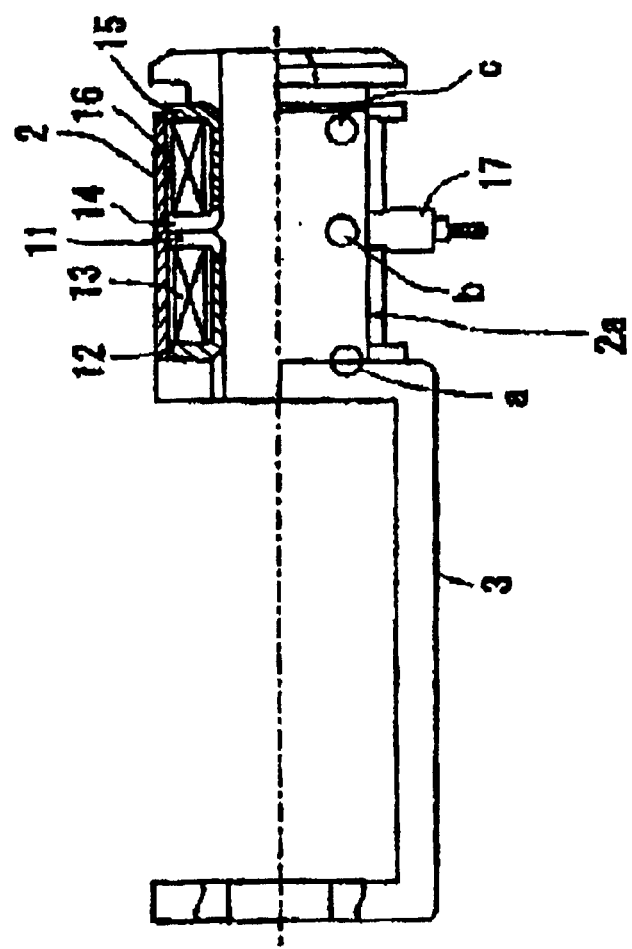
Fig. 1 (2)
Fig. 1 (1)

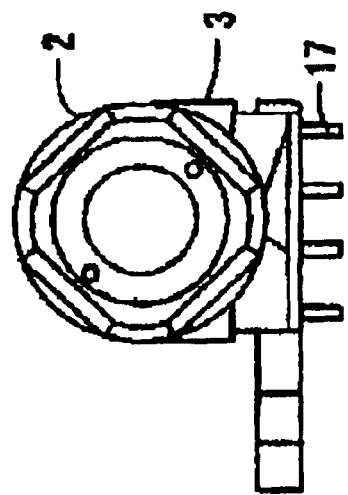
Fig. 3 (2)
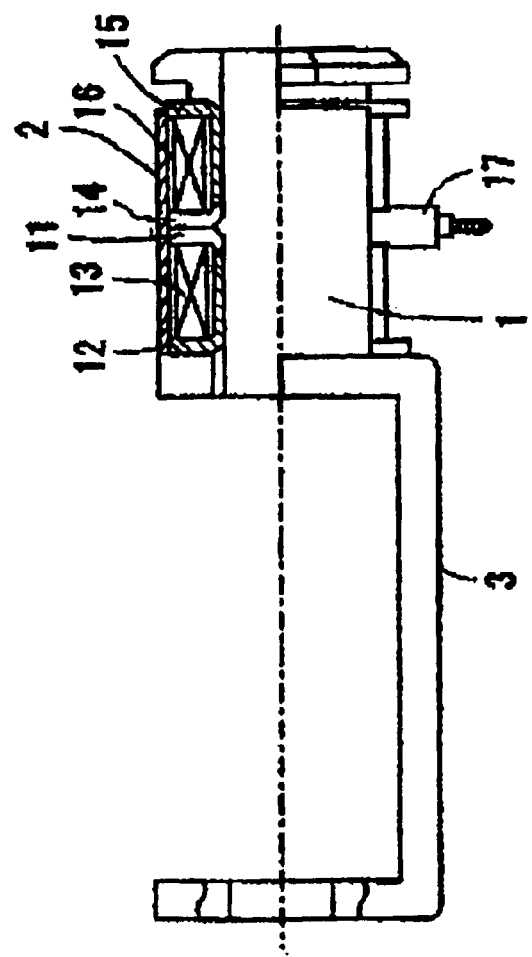
Fig. 3 (1)

MOTOR WITH STATOR HAVING INNER CORES AND OUTER CORES

BACKGROUND OF THE INVENTION

1. Field of the Invention

The present invention relates to a motor having a plurality of pairs of cores, each pair consisting of an inner core and an outer core, arranged next to one another along the axial direction so that the inner cores are in contact with each other, and a coil wound around each pair of cores.

2. Description of Related Art

A motor having a plurality of pairs of cores, each pair consisting of an inner core and an outer core, arranged next to each other along the axial direction so that the inner cores are in contact with each other, and a coil wound around each pair of cores, has been known for some time. For example, such a motor is described in Japanese Laid-Open Patent Application No. 10-271793. The motor described in this reference is a stepping motor, in which a lead screw section is provided on a motor rotor shaft to which a rotor magnet is fixed, and the motor rotor shaft and the lead screw section are rotatably supported with respect to a frame. A stator section of the motor consists of two pairs of cores. Each of the pairs has an inner core and an outer core. Each of the inner cores and the outer cores has teeth-like poles, and the inner core teeth-like poles and outer core teeth-like poles are alternately disposed and face the rotor magnet. Ring-shaped coils with coil bobbins are placed between the inner cores and the outer cores.

The stator section of the motor may be modified to simplify the structure of the stator section of this motor in a manner shown in FIGS. 3 (1) and 3 (2). FIG. 3 (1) is a side view of the motor with a partial cross section. To simplify the description, a rotor part with a rotor magnet in the motor is omitted. FIG. 3 (2) is a front view of the motor. The stator section includes a coil section 1, a case 2 provided to cover the coil section 1, and a frame 3 to which the coil section 1 and the case 2 are attached.

In FIG. 3, the coil section 1 has a ring-shaped coil 13 wound around a first pair of cores that includes an inner core 11 and an outer core 12. Each of the inner core 11 and the outer core 12 has teeth-like poles facing the rotor magnet of the rotor. The coil section 1 also has a ring-shaped coil 16 wound around a second pair of cores that includes an inner core 14 and an outer core 15. Each of the inner core 14 and the outer core 16 has teeth-like poles facing the rotor magnet of the rotor. The coil section 1 is structured in such a way as to have the core pairs arranged in the axial direction so that the inner cores 11 and 14 come in contact with each other.

The "inner cores" referred to herein are the cores that are disposed on the inner side, and the "outer cores" are the cores that are positioned on the outer side along the axial direction, when the two pairs of cores are arranged in the axial direction, as the figure shows.

Connection terminals 17 are attached to the inner cores 11 and 14 to supply current to the coils 13 and 16. A rotor having a rotor shaft and a rotor magnet formed in a unitary structure is provided within the first pair of cores and the second pair of cores. However, the rotor is omitted from the drawings for simplicity of the illustration.

The coil section 1 having the coils 13 and 16 is covered by a cylindrical case 2. The cylindrical case 2 is slid over the coil section 1 in the axial direction and lightly pressure-fit over it, and the case 2 is connected with the first pair of cores and the second pair of cores. However, a part of the cylindrical case 2 is open to allow the connection terminals 17 to be exposed to the outside.

The motor described above may have the following problems. In the motor shown in FIG. 3, when the inner cores 11 and 14 and the outer cores 12 and 15 are joined by the case 2 made of a magnetic material, the coil 13 is expected to form a magnetic circuit surrounded by the inner core 11, the case 2 and the outer core 12, while the coil 16 is expected to form a magnetic circuit surrounded by the inner core 14, the case 2 and the outer core 15. In other words, the coils 13 and 16 must form independent phase A and phase B magnetic circuits. However, if the case 2 is installed by a light pressure-fit over the inner and outer cores, a small gap may be formed between the case 2 and the inner cores 11 and 14. In such a case, the phase A and phase B magnetic circuits on the coils 13 and 16 fail to fully become independent. Instead, a single magnetic circuit via the case 2 can be formed. This causes the magnetic balance between the phase A and phase B magnetic circuits to be unstable.

Furthermore, the stator section of the motor described above has a relatively complex structure. Also, although the motor shown in FIG. 3 has a relatively simplified structure compared to conventional motors, its angle precision cyclically fluctuates and its rotation may not be uniform when the motor is driven by exciting in phases 1–2. This may lead to poor detent torque and poor angle precision, which may in turn cause noise problems.

SUMMARY OF THE INVENTION

It is an object of the present invention to provide a motor that has a relatively simple structure and yet has a uniform rotational characteristic.

In accordance with an embodiment of the present invention, a motor has a stator with a simplified structure having a stator section including at least two core pairs. Each of the core pairs includes inner and outer cores. Coils are wound around the core pairs. A case made of a magnetic material covers the coils in a manner that the case more securely comes in contact with the inner cores and the outer cores. The case is welded to at least the inner cores to securely form independent magnetic circuits.

In accordance with another embodiment of the present invention, the case is welded to the inner cores and the outer cores to securely form independent magnetic circuits.

As a result, there is no need to incorporate steps in a manufacturing process, which could lead to increased costs, such as, for example, finishing a case with more stringent dimensional precision against inner cores or employing a deep drawing method in order to achieve a higher dimensional precision in the cylindrical curved surface of the case.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1 (1) shows a side view of a structure of key elements of a motor in accordance with one embodiment of the present invention.

FIG. 1 (2) shows a front view of the motor shown in FIG. 1 (1).

FIG. 3 (1) shows a side view of a structure of key elements of a motor.

FIG. 3 (2) shows a front view of the motor shown in FIG. 3 (1).

PREFERRED EMBODIMENTS

Figure 2:
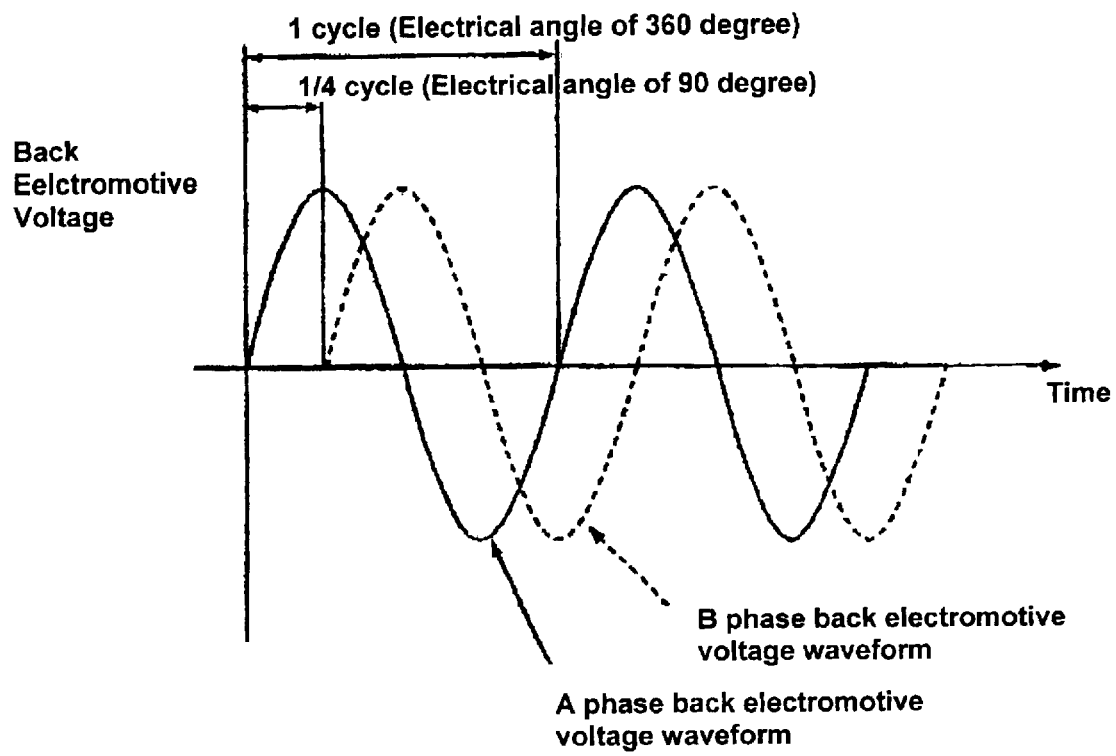
FIG. 2 is a graph showing magnetic characteristics gained from the present invention.

FIGS. 1 (1) and 1 (2) show a motor in accordance with one embodiment of the present invention. More particularly, FIG. 1 shows a stepping motor in accordance with one embodiment of the present invention. FIG. 1 (1) is a side view with a partial cross section of the motor, and FIG. 1 (2) is a front view of the motor. In these figures, a coil section 1, a case 2, a frame 3, inner cores 11 and 14, outer cores 12 and 15, coils 13 and 16, and connection terminals 17 all have generally the same structures as in the example shown in FIG. 3.

More specifically, the motor includes a stator section having a coil section 1, a case 2 provided to cover the coil section 1, and a frame 3 to which the coil section 1 and the case 2 are attached. The coil section 1 has a ring-shaped coil 13 wound around a first pair of cores that includes an inner core 11 and an outer core 12. Each of the inner core 11 and the outer core 12 has teeth-like poles facing the rotor magnet of the rotor. The coil section 1 also has a ring-shaped coil 16 wound around a second pair of cores that includes an inner core 14 and an outer core 15. Each of the inner core 14 and the outer core 16 has teeth-like poles facing the rotor magnet of the rotor. The coil section 1 is structured in such a way as to have the core pairs arranged in the axial direction so that the inner cores 11 and 14 come in contact with each other.

The "inner cores" referred to herein are the cores that are disposed on the inner side, and the "outer cores" are the cores that are positioned on the outer side along the axial direction, when the two pairs of cores are arranged in the axial direction, as the figure shows.

Connection terminals 17 are attached to the inner cores 11 and 14 to supply current to the coils 13 and 16. As typically provided in an ordinary motor, a rotor having a rotor shaft and a rotor magnet formed in a unitary structure is provided within the first pair of cores and the second pair of cores. However, the rotor is omitted from the drawings for simplicity of the illustration.

The coil section 1 having the coils 13 and 16 is covered by a cylindrical case 2. The cylindrical case 2 is slid over the coil section 1 in the axial direction and lightly pressure-fit over it. In other words, the cylindrical case 2 is pressure-fitted over the coil section 1 under a light pressure, such that the case 2 is connected with the first pair of cores and the second pair of cores. A part of the cylindrical case 2 is open to allow the connection terminals 17 to be exposed to the outside. In one embodiment, the cylindrical case 2 may be formed from a thin plate made of a magnetic material. The thin plate may be curled to have an arc-shape or a U-channel shape. The curled thin plate defining the case 2 may have resilience that allows the case 2 to be fitted over the first pair of cores and the second pair of cores under a pressure.

In accordance with one embodiment of the present invention, the case 2 is welded to the inner cores 11 and 14 in order to secure the joining of the case 2 that is lightly shrunk fit over the inner cores 11 and 14. In another embodiment, the case 2 is welded to the inner cores 11 and 14 and to the outer cores 12 and 15 in order to secure the joining of the case 2 that is lightly shrunk fit over the inner cores 11 and 14 and the outer cores 12 and 15. In this embodiment, the case 2 is not a complete cylinder that encompasses the entire circumference, but is an arc-shaped cylindrical case with an opening angled through 240° for the connection terminals 17.

FIG. 1 (1) shows welding spots at locations a, b and c in the axial direction. The welding spot b is used to weld the case 2 with the inner cores 11 and 14. Welding spots a and c are used to weld the case 2 with the outer cores 12 and 15. FIG. 1 (2) is an example with welding at five spots in the circumferential direction, i.e., welding spots A, B, C, D and E. The welding spots A and E are positioned close to ends 2a of the arc-shaped case 2 formed to leave an opening for the connection terminals 17 and are designed to securely connect and fix the ends 2a of the case 2 to the cores. The welding spots B, C and D are positioned at appropriate locations in between the welding spots A and E.

First, when the case 2 is welded to the inner cores 11 and 14, three welding spots A, C and E or five welding spots A through E in the circumferential direction are selected at the position of the welding spot b in the axial direction. When welding the case 2 with the outer cores 12 and 15, three welding spots A, C and E in the circumferential direction are selected at the positions of the welding spots a and c in the axial direction. Accordingly, in this embodiment, the case 2 may be welded only to the inner cores 11 and 14 at three spots at minimum, or the case 2 may be welded at 11 spots at maximum that include at five spots to weld the case 2 to the inner cores 11 and 14 and at six spots to weld the case 2 to the outer cores 12 and 15. It is noted that welding spots can be appropriately selected between the minimum number of three spots and the maximum number of eleven spots. It is also noted that the case 2 can be welded at twelve spots or more.

As a result, even if the dimensional precision of the case 2, especially the dimensional precision of the case 2 against the inner cores 11 and 14, were to be somewhat rough, welding can improve the close adhesion between the inner cores 11 and 14 (as well as outer cores 12 and 15) and the case 2. This results in an improved flow of magnetic flux from the case 2 to the inner cores 11 and 14, and thereby allows each of the phase A and phase B magnetic circuits to become independent. This contributes to stable magnetic characteristics, as shown in FIG. 2.

FIG. 2 shows a situation where the phase B back electromotive voltage waveform lags the phase A back electromotive voltage waveform by ¼ cycle. To improve magnetic characteristics, it is effective to primarily improve the close adhesion between the case 2 and the inner cores 11 and 14 as described above. It is noted that the welding between the case 2 and the outer cores 12 and 15 is supplemental.

Although there is welding at three spots or five spots in the circumferential direction in this embodiment, welding at two spots may be acceptable. However, if positions A and E close to the outer circumference ends of the case 2 and the position C midpoint between A and E are selected so that there are three welding spots in the circumferential direction, for example, then the positions A, C and E would be disposed 120° apart from one another. As a result, the case 2 is welded in better balance against the cores and would be more sturdily fixed overall compared to a situation in which there are two welding spots in the circumferential direction. Consequently, this would prevent a defect in which both of the outer circumference ends 2a of the case 2 become open, and at the same time contribute to enhance the rigidity of the 240° arc-shaped case 2 itself.

To weld the case 2 with the inner cores 11 and 14 and the outer cores 12 and 15, laser welding using a laser beam, plasma welding using plasma arc, or projection welding can be employed. For example, in a spot welding using a laser beam, when the laser beam is focused on each of the welding spots on the case 2, pressure or heat is propagated to the reverse side of the case 2, thereby welding the case 2 with each of the inner cores 11 and 14 and the outer cores 12 and 15.

Further, due to the fact that high precision is not required for the dimensions of the case 2, the case 2 can be manufactured by a method in which a thin plate is curled instead of the conventional deep drawing method, which would reduce costs.

It is noted that, in the motor shown in FIG. 3, when the inner cores 11 and 14 and the outer cores 12 and 15 are joined by the case 2 made of a magnetic material, the coil 13 is designed to form a magnetic circuit surrounded by the inner core 11, the case 2 and the outer core 12, while the coil 16 is designed to form a magnetic circuit surrounded by the inner core 14, the case 2 and the outer core 15. In other words, the coils 13 and 16 are designed to form independent phase A and phase B magnetic circuits. However, if the case 2 is installed by a light pressure-fit over the inner and outer cores, a small gap may be formed between the case 2 and the inner cores 11 and 14. In such a case, the phase A and phase B magnetic circuits in the coils 13 and 16 fail to fully become independent, and a single magnetic circuit via the case 2 can be formed instead. This causes the magnetic balance between the phase A and phase B magnetic circuits to be unstable.

Figure 4:
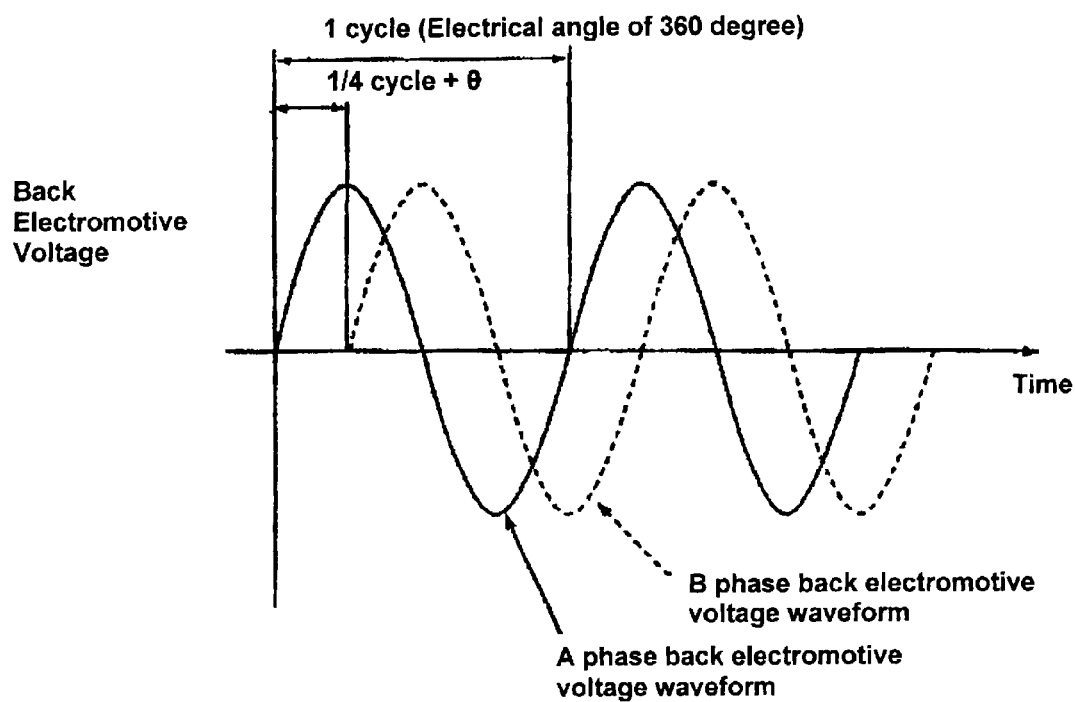
FIG. 4 is a graph showing magnetic characteristics provided by the structure shown in FIGS. 3 (1) and 3 (2).

FIG. 4 indicates a situation in which a phase B back electromotive voltage waveform lags a phase A back electromotive voltage waveform by ¼ cycle +θ. When there is a displacement θ between the phase A and the phase B, the angle precision may fluctuate cyclically to levels of great-great, small-small, great-great . . . , when the motor is driven by excitation of phases 1–2. Consequently, the rotation may become uneven and the detent torque and angle precision may become poor, which cause noise.

In contrast, in accordance with an embodiment of the present invention, the case and at least the inner cores are connected to one another through welding. Alternatively, the case and the inner cores and the outer cores are connected to one another through welding. As a result, the case and the inner cores more closely contact with one another and the phase A and phase B magnetic circuits excited by the two coils become independent. Since the independence of magnetic circuits formed by having current flow through each coil is secured, the magnetic characteristics of the entire motor become more stable and favorable.

In the above-described embodiments of the present invention, the case 2 is connected to the coil section 1 by welding at plural spots. However, the present invention is not limited to the above-described embodiments and many modifications can be made without departing from the subject matter of the present invention. For example, the positions and the numbers of the welding spots indicated in FIG. 1 may be altered according to the manufacturing precision of the case 2 or the required magnetic characteristics.

As described above, a case is lightly shrunk fit or pressure fit over inner cores improves close adhesion through welding, it is possible to make magnetic circuits formed by a plurality of coils to be independent and to improve the magnetic properties.

Furthermore, by having a case and outer cores also be in close adhesion through welding, it is possible to make magnetic circuits formed by a plurality of coils to be more securely independent and to improve the magnetic properties.

As a result, the magnetic balance improves, and there would be a reduction in the detent torque and a stable angle precision in the stepping motor. In addition, the reduction in the detent torque would diminish noise.

Moreover, the present invention allows the close adhesion to be enhanced by welding the case with inner cores, which eases the precision required of the case. Consequently, the case can be manufactured through curling, which would reduce cost.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor defining an axial direction, the motor comprising:
   a plurality of core pairs, each of the core pairs consisting of an inner core and an outer core, arranged next to each other along the axial direction such that the inner cores are in contact with each other;
   a coil wound around each of the core pairs; and
   a case formed from a magnetic material that covers the coils wherein the case is welded to the inner cores but not welded to the outer cores, to form two independent magnetic circuits formed by the inner cores, the case, and the outer cores;
   wherein the motor is a stepping motor.

2. A motor according to claim 1, wherein each of the inner cores and each of the outer cores has teeth-like poles;
   the teeth-like poles on the inner cores and the teeth-like poles on the outer cores are alternately disposed to face a rotor magnet of a rotor that is disposed inside the plurality of core pairs; and
   the case is commonly in contact with outer circumference sections of the inner cores and outer cores that form the plurality of core pairs.

3. A motor according to claim 2, wherein the case is formed from a curled thin plate.

4. A motor according to claim 3, further comprising connection terminals configured to supply current to the coils connected to the inner cores and the outer cores, wherein the case has an arc-shape that defines an opening for the connection terminals.

5. A motor according to claim 4, wherein the arc-shaped case has end sections, and the case and the inner cores are welded at welding spots at the end sections of the arc-shaped case and at a midpoint in the circumferential direction between the end sections of the arc-shaped case.

* * * * *